No. 623,106. Patented Apr. 11, 1899.
G. RANSON.
PROCESS OF DECOLORIZING AND PURIFYING SUGAR JUICE OR SYRUP.
(Application filed June 12, 1897.)
(No Model.)
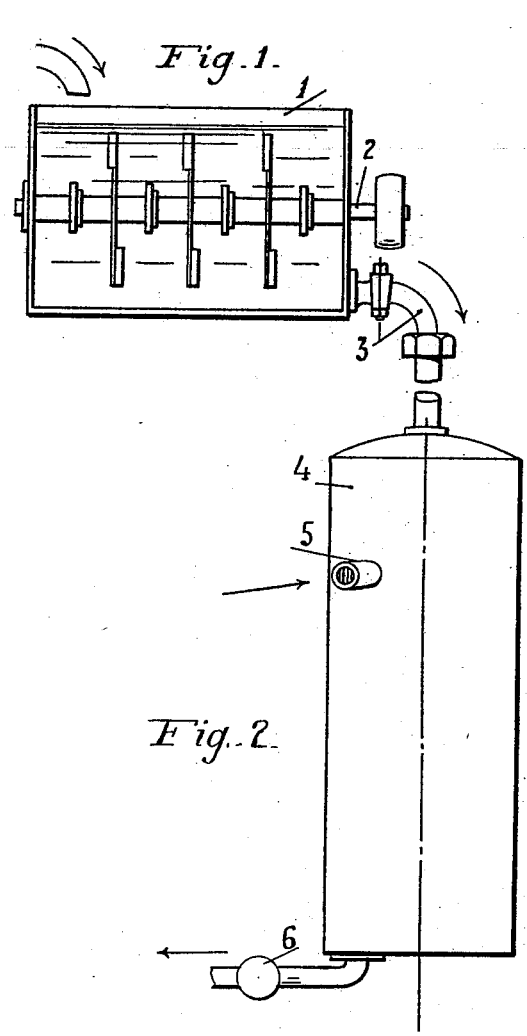
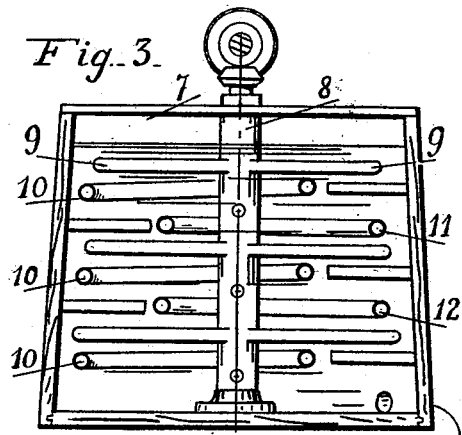
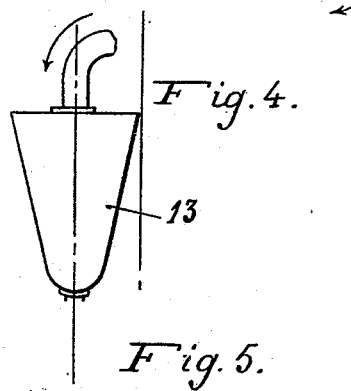
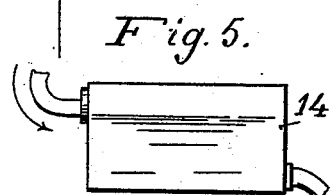
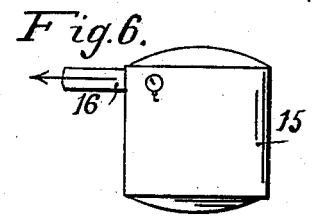

UNITED STATES PATENT OFFICE.

GEORGES RANSON, OF MONTMORENCY, FRANCE, ASSIGNOR TO THE RANSON'S SUGAR PROCESS, LIMITED, OF LONDON, ENGLAND.

PROCESS OF DECOLORIZING AND PURIFYING SUGAR JUICE OR SYRUP.

SPECIFICATION forming part of Letters Patent No. 623,106, dated April 11, 1899.

Application filed June 12, 1897. Serial No. 640,561. (No specimens.)

*To all whom it may concern:*

Be it known that I, GEORGES RANSON, a citizen of the French Republic, residing at Montmorency, France, have invented certain new and useful Improvements in Processes of Decoloring and Purifying Sugar Juice or Syrup, (for which I have received patents as follows: in France, No. 248,834, dated July 12, 1895; in Belgium, No. 117,152, dated August 25, 1895; in Belgium, No. 121,472, dated May 21, 1896; in Germany, No. 91,904, dated May 20, 1896, and No. 95,204, dated September 11, 1896; in Italy, No. 41,544/330, dated May 21, 1896; in Austria, No. 46/3,880, dated May 29, 1896; in England, No. 19,815, dated September 8, 1896; in Spain, No. 19,129, dated May 30, 1896; in Hungary, No. 6,002, dated July 11, 1896, and in Norway, No. 7,792, dated August 5, 1896;) and I do hereby declare the following to be a full, clear, and exact description of the invention, such as will enable others skilled in the art to which it appertains to make and use the same.

The process has for its object to clear and render colorless sugar juice or syrup, whether obtained from the beet or from cane, and, broadly stated, this is effected by oxidizing the coloring-matter or impurities, then getting rid of the excess of oxygen by a reducing agent, which is preferably used in excess, and then exactly neutralizing the excess of the reducing agent by a measured quantity of an oxidizing agent. The treatment thus outlined is carried on by keeping the syrup generally alkaline. I may, however, use a treatment in which the first oxidation step is dispensed with and the syrup is instead rendered acid, then treated with the reducing agent, and finally treated with the oxidizing agent. This acid treatment may thus either be considered as a reversal of the alkaline treatment in so far as in it I first reduce and then oxidize instead of first oxidizing and then reducing, or it may be considered as a treatment embodying merely the last two steps of the alkaline treatment—namely, the reducing and the oxidizing steps in order.

The apparatus which I use in this process of decoloration and defecation is of the general type and is shown in the drawings, in which—

Figure 1 shows a stirring-vat; Fig. 2, a carbonating-chamber; Fig. 3, a heating and cooling tank; Fig. 4, a filter; Fig. 5, a settling-tank, and Fig. 6, a vacuum-pan.

The stirring-vat 1 has stirring-arms mounted on a shaft 2. The carbonating-chamber 4 has an inlet-pipe 3 for carbonic-acid gas and an outlet-valve 6. The heating-tank 7 has stirrers 9, mounted on a shaft 8, and heating-coils 10, and cooling-coils 11 12. The filter 13, settling-vat 14, and vacuum-pan 15, with its exhaust-pipe 16, need not be further described.

I may obviously subject syrups of various grades to this treatment; but for convenience I will describe the process as effected upon a low grade of syrup called "common clear," which is thereafter to be boiled into a massecuite. This syrup I use at a concentration of about 30° Baumé and keep in the tank 7 at a temperature of about 50° centigrade. Considering now this quantity of syrup in the tank 7, I shall proceed to describe in detail the steps of my process according to what may for convenience be called the "alkaline treatment." It is first necessary under this treatment to insure that the syrup to be operated upon is possessed of a slight degree of alkalinity, say of one ten-thousandth. To this end I add to the syrup in the tank 7 for each one hundred kilograms of syrup about one-half liter of barium hydroxide $Ba(OH)_2$ solution, saturated at 15° centigrade, or I may use instead for each one hundred kilograms of syrup about fifty grams of carbonate of soda, $(Na_2CO_3.)$ The effect of this addition of alkaline material is, as I have stated, to insure the alkalinity of the syrup. In the case of the barium hydroxide there is the further function of precipitating the phosphates, sulphates, carbonates, and organic salts and converting them into barium salts. Thus $$K_2SO_4 + Ba(OH)_2 = BaSO_4 + 2KOH.$$

The potassium hydroxide thus formed and the existing excess of barium hydroxide insure the alkalinity of the solution, and the barium sulphate being insoluble and the other insoluble barium salts may thereafter be removed. Having thus rendered the solution slightly alkaline, the next step is to treat it with an oxidizing agent, such as hydrogen peroxide. I produce this hydrogen peroxide chemically pure by the treatment of barium peroxide with sulphuric acid by a reaction which is well known.

$$BaO_2 + H_2SO_4 = BaSO_4 + H_2O_2.$$

The hydrogen peroxide solution is prepared of such strength that one volume will yield five volumes of oxygen. To this hydrogen peroxide solution I add for the purpose of increasing its stability a proper quantity of phosphoric acid, it being known that hydrogen peroxide does not readily break up in an acid solution, whereas it readily decomposes in a solution which is alkaline. Just before using the hydrogen peroxide, which has been acidulated with phosphoric acid, I precipitate the acid as an insoluble phosphate by treatment with lime, the insoluble phosphate of calcium thus formed being subsequently removed from the sugar by filtration. Having thus obtained the hydrogen peroxide which I employ, preferably by the process set out in the last paragraph, I add it to the alkaline syrup in the vat in the proportion of one-half to five liters for every one hundred kilograms of sugar, according to the color of the syrup being treated. At the same time, however, I add to the mixture about one hundred grams of boneblack for every one hundred kilograms of syrup under treatment. This boneblack is prepared for use in order to purify it by treatment with hydrochloric acid in order to free it from the carbonates and phosphates generally contained therein and by then washing it. This boneblack added to the alkaline syrup containing the hydrogen peroxide has several purposes. It acts to promote the decomposition of the hydrogen peroxide; also, to hold or occlude the oxygen given off from the hydrogen peroxide in the alkaline syrup, and thus to prevent its too rapid escape, and it further acts to intensify the action of the oxygen.

The oxidation process, in preference by means of hydrogen peroxide in the presence of boneblack, as just described, goes on for an hour or an hour and a half. By it the organic matters and those susceptible to bleaching are oxidized and rendered colorless. The reactions which follow are shorter in duration. Instead of using hydrogen peroxide as my oxidizing agent in this first oxidizing step of the process I may use barium dioxide instead. This I first purify by washing or otherwise, and then I suspend the same in a volume of water, so as to obtain a milky liquid of about 20° to 25° Baumé, which I add in the proportion of two to five per cent. to the volume of syrup to be treated. The solution of barium dioxide and of syrup are thoroughly stirred and mixed together in a vat during the entire oxidizing period. The reaction which takes place may be expressed as follows:

$$BaO_2 + C_{12}H_{22}O_{11} = BaO, C_{12}H_{22}O_{11} + O.$$

Barium sucrate is thus formed and nascent oxygen is given off, which effects an oxidation of the coloring-matters and impurities. The solution and syrup are allowed to remain together until the development of oxygen ceases to be visible. I thereupon allow the mixture to flow from the tank 1 by means of the pipe 3 to the carbonating-chamber 4, where it is subjected to the action of carbonic-acid gas ($CO_2$) which is admitted through the pipe 5. Carbonate of barium is thus formed, and the sugar is again set free by a reaction, the formula for which it is unnecessary to write down. If a single passage through the carbonator is insufficient, the mixture may be again passed therethrough. The carbonating process being completed, the barium carbonate is filtered off. This completes the oxidizing step when barium dioxide is used. I prefer, however, to use hydrogen peroxide in the manner first pointed out by me in this specification in the first oxidizing step, and, assuming that the syrup has been treated with hydrogen peroxide in the first oxidizing step, I will now keep on with the description of what next takes place after the oxidation process by means of hydrogen peroxide, preferably in the presence of boneblack, has gone on for an hour or an hour and a half, as before described.

The next step is to remove the excess of oxygen, which would otherwise remain in the sugar and which might even at a subsequent stage of the process act to recolor the syrup. This I do by adding a powerful reducing agent, which acts not only to take up the excess of oxygen remaining in the syrup, but also as a reducer. The reducing agent which I prefer to employ is hyposulphurous acid, ($H_2SO_2$.) This hyposulphurous acid I can prepare in two ways. I can take water with from one hundred to two hundred grams of sulphur dioxide per liter of water, to each liter of which is added about twenty grams of powdered zinc or magnesium, thus producing hyposulphurous acid in accordance with the following reactions:

$$2(H_2SO_3) + Zn = H_2SO_2 + ZnSO_3 + H_2O.$$

It will be noticed, however, that I use an excess of sulphur dioxide. The mixture containing the excess of sulphur dioxide and the hyposulphurous acid can then be poured into the syrup to be treated, or I can pass sulphur dioxide directly into the syrup, in which has been placed ten grams of powdered zinc or magnesium per hectoliter of syrup to be treated, and by stirring the mixture thoroughly the hyposulphurous acid is formed in the mixture itself in accordance with the formula which I have just given and acts in the nascent state.

It is to be remembered that whether the mixture of hyposulphurous acid and zinc sulphite with its excess of sulphur dioxide is poured into the syrup or the sulphur dioxide is passed into the syrup direct that in either case the first effect will be to destroy the alkalinity of the syrup and convert the barium hydroxide Ba(OH)$_2$ which was contained therein into zinc sulphite in accordance with the following formula:

$$SO_2 + Ba(OH)_2 = BaSO_3 + H_2O$$

The hyposulphurous acid then proceeds to take up the excess of oxygen which remains in the syrup from the oxidizing step and also to bleach any organic matters in accordance with a reaction which is well known. To accelerate this reaction, the temperature of the tank is raised to 60° centigrade. Up to this point it appears that I have first rendered the syrup alkaline—as, for instance, by barium hydroxide—that I have then oxidized the syrup—as, for instance, by hydrogen peroxide, which gives off nascent oxygen in an alkaline solution—and that I have then reduced the excess of oxygen by a reducing agent, such as hyposulphurous acid. This reducing step has, however, as I have pointed out, neutralized the alkalinity of the solution and made it acid. I therefore next again add an excess of barium hydroxide, bicarbonate of soda, lime, or the like and restore the alkalinity. When barium hydroxide is used, it converts the remaining zinc sulphite into barium sulphite in accordance with the following formula:

$$ZnSO_3 + Ba(OH)_2 = BaSO_3 + Zn(OH)_2$$

and also restores the alkalinity. I thereupon convert the sulphite or sulphites into sulphates by the following procedure: I titrate a weighed portion of the mass by means of an iodine solution and starch, and with a table prepared in advance I determine the exact quantity of hydrogen peroxide to be added to convert all of the sulphite into sulphate. I then add such exact quantity of hydrogen peroxide. The reaction is as follows:

$$BaSO_3 + H_2O_2 = BaSO_4 + H_2O.$$

The barium sulphate is insoluble. I thereupon raise the temperature of the syrup to about 78° centigrade and filter off the barium sulphate, zinc hydrate, &c., whereupon I obtain a decolored syrup, which may be heated and filtered and boiled down to a masse-cuite in a vacuum-pan.

To give a condensed statement of the important steps of the specific process above described as the "alkaline treatment," it will be seen that I have first made the syrup alkaline by barium hydroxide, Ba(OH)$_2$, that I have then added pure hydrogen peroxide (H$_2$O$_2$) in the presence of pure boneblack, which gives off oxygen, that I have then added hyposulphurous acid, (H$_2$SO$_2$,) which takes up the excess of oxygen and also reduces and forms sulphites, that I have restored the alkalinity by adding more barium hydroxide, Ba(OH)$_2$, forming barium sulphite, and that I have converted this sulphite into sulphate by adding a predetermined amount of hydrogen peroxide.

I have now to describe the acid treatment, which may be briefly done. The first step consists in saturating the syrup at a temperature below 50° centigrade with sulphur dioxide (SO$_2$.) This saturates the alkalies, lime, potash, and soda and, moreover, decomposes the organic matters. I then filter the syrup. Thereupon I again pass sulphur dioxide into the filtered syrup in the proportion of .05 to five grams per liter, and I agitate the liquid mass from fifteen to twenty minutes in the presence of powdered zinc ten to fifty grams per hectoliter, so that hyposulphurous acid is formed in the body of the syrup, the reaction being $$2(H_2SO_3) + Zn = H_2SO_2 + ZnSO_3 + H_2O.$$

This hyposulphurous acid decolors the syrup rapidly, liquefies the viscous matter, clears out organic matter, and precipitates nitrogenous material. I now raise the temperature from 50° to 75° centigrade, the hyposulphurous acid being broken up into sulphur dioxide, taking oxygen from the organic matter in the syrup. I then filter. I then add barium hydroxide to render the solution alkaline, forming barium sulphite and zinc hydrate, and then add peroxide of hydrogen in measured quantity to convert the sulphites into sulphates, just as in the alkaline treatment.

What I claim is—

1. The process of clarifying sugar-syrup which consists in subjecting it to an oxidizing agent, then to a reducing agent in excess, to neutralize the excess of oxygen and then adding a determinate quantity of an oxidizing material to exactly neutralize the excess of the reducing agent, substantially as described.

2. A step in the process of decoloring sugar-syrup which consists in subjecting it to the simultaneous action of hydrogen peroxide and boneblack for the purpose stated, in an alkaline solution, substantially as described.

3. The process of decoloring sugar-syrup which consists in treating it with an excess of hyposulphurous acid as a reducing agent and thereafter with an oxidizing agent to neutralize the excess of the reducing agent.

4. The process of decoloring sugar-syrup which consists in treating it with an excess of hyposulphurous acid in a nascent state as a reducing agent and thereafter with an oxidizing agent to neutralize the excess of the reducing agent.

5. The process of decoloring sugar-syrup which consists in treating it with an excess of hyposulphurous acid as a reducing agent, and thereafter with an oxidizing agent in exactly-measured quantity to neutralize the excess of the hyposulphurous acid, substantially as described.

6. The process of decoloring sugar which consists in passing sulphur dioxide in the proportion of .05 to five grams per liter into the syrup and agitating the same in the presence of powdered zinc, then raising the temperature to above 50° centigrade, and then adding an oxidizing agent, substantially as described.

7. The process of decoloring sugar-syrup which consists in passing sulphur dioxide into the syrup and adding powdered zinc, substantially as described.

8. The process of decoloring sugar-syrup which consists in passing sulphur dioxide into the syrup, agitating the same in the presence of powdered zinc and raising the temperature to above 50° centigrade, substantially as described.

In testimony whereof I affix my signature in presence of two witnesses.

GEORGES RANSON.

Witnesses:
ANTOINE AUGIER,
CHARLES RANSON.